United States Patent
Childers et al.

(10) Patent No.: US 8,881,553 B2
(45) Date of Patent: Nov. 11, 2014

(54) ASSEMBLY FOR PRECISION DATUM ALIGNMENT AND METHOD OF USE

(75) Inventors: Darrell R. Childers, Hickory, NC (US); Joseph P. Howard, Hickory, NC (US); Arnold Deal, III, Hildebran, NC (US); Dirk E. Schoellner, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 351 days.

(21) Appl. No.: 13/485,851

(22) Filed: May 31, 2012

(65) Prior Publication Data

US 2012/0305807 A1 Dec. 6, 2012

Related U.S. Application Data

(60) Provisional application No. 61/492,362, filed on Jun. 1, 2011.

(51) Int. Cl.
  *G02B 6/02*  (2006.01)
  *B23K 26/04* (2014.01)
  *G02B 6/25*  (2006.01)
  *B23K 26/02* (2014.01)

(52) U.S. Cl.
  CPC ............... *G02B 6/25* (2013.01); *B23K 26/026* (2013.01); *B23K 26/043* (2013.01)
  USPC ....... 65/392; 219/121.67; 264/1.27; 264/400; 385/134; 385/147

(58) Field of Classification Search
  CPC ... B23K 26/026; B23K 26/041; B23K 26/043
  USPC .......................................................... 65/392
  See application file for complete search history.

(56) References Cited

U.S. PATENT DOCUMENTS

2012/0154922 A1* 6/2012 Briand et al. ................. 359/641

FOREIGN PATENT DOCUMENTS

| EP | 1278610 B1 | 1/2003 |
| EP | 1330331 | 7/2003 |

* cited by examiner

*Primary Examiner* — Jerry Rahll
(74) *Attorney, Agent, or Firm* — Michael L. Leetzow, P.A.

(57) ABSTRACT

A calibration assembly has a base and mounting elements to mount the base to a laser. The base has a front, middle and rear portions that are used to align the calibration assembly to the laser to cleave optical fibers with the laser. The front portion has a channel to receive the optical fibers, the middle portion has openings to confirm alignment of the laser; and the rear portion has a rear opening used to adjust the pitch and roll of the laser.

19 Claims, 14 Drawing Sheets

ASSEMBLY FOR PRECISION DATUM ALIGNMENT AND METHOD OF USE

REFERENCE TO RELATED CASE

This application claims priority under 35 U.S.C. §119 (e) to provisional application No. 61/492,362, filed on Jun. 1, 2011, which is hereby incorporated by reference in its entirety.

BACKGROUND OF THE INVENTION

Field of the Invention

Traditional fiber optic connectors require a labor intensive mechanical cleave and polish assembly process to terminate the fiber optic connector for final use. However, the costs of having people perform the cleaving and polishing is also expensive. One way in which to reduce the costs of the fiber optic connectors is to eliminate this step. One known way is to use a laser to cleave the optical fibers. Carbon dioxide laser systems have been used to cleave optical fibers and are an inexpensive laser. The use of an off-the-shelf laser marker system would be the best solution as they would be the most cost-effective laser to use. A custom laser would be much more expensive and would thus negate some of the cost savings gained by eliminating the mechanical cleave and polish processes.

One drawback of using an off-the-shelf laser is that laser cleaving process is sensitive to the alignment between the laser marker datums and the optical fiber to be cleaved. All six degrees of freedom must be controlled and aligned correctly for suitable fiber optic cleaves to occur. In fact, all six degrees of freedom must be controlled down to a tolerance of tenths of millimeters. Unfortunately, off-the-shelf laser markers do not have controlled datum planes between the laser axis and cutting plane and the outside body of the laser marker that is used to fixture the optical fiber in place. Indeed, the uncertainty of the mounting hole locations to the laser axis is typically multiple millimeters. If the positioning is off, the ends of the optical fibers will make it difficult if not impossible to transmit light, insert them into a ferrule, or mate them with other optical fibers. However, many off-the-shelf laser systems control the location and the focal point of the beam by controlling the laser beam through the system software. In addition, many of these systems allow the user to setup a three dimensional coordinate system through the use of software.

Thus, a new assembly to be used with the off-the-shelf laser and a method of using the assembly is disclosed to allow for a cheaper and faster way to terminate and finish fiber optic connectors.

SUMMARY OF THE INVENTION

The present invention is directed to calibration assembly for a laser used to cleave optical fibers that includes a base fixedly attached to the laser, the base further including a front portion to receive optical fibers in a predetermined relationship to the base, a middle portion having at least two laser openings, the at least two laser openings generally disposed in line with a laser beam emanating from the laser, a rear portion having a rear opening in alignment with the front portion, and also mounting elements to fixedly attach the base to the laser.

In some embodiments, the front portion of the base has a groove to receive optical fibers to be cleaved by the laser, the groove disposed at a predetermined angle relative to the laser beam emanating from the laser.

In other embodiments, the assembly also includes a mirror to reflect laser beams from the laser through the rear opening in the rear portion, the mirror configured to removably engage a guide bar.

In another aspect, the present invention is a directed to method of calibrating a laser to cleanly cleave optical fibers includes the steps of attaching a calibration assembly to the laser, the calibration assembly comprising a base, the base further comprising a front portion to receive optical fibers in a predetermined relationship to the base, a middle portion having at least two laser openings, the at least two laser openings generally disposed in line with a laser beam emanating from the laser; and a rear portion having a rear opening in alignment with the front portion; and mounting elements to fixedly attach the base to the laser, aligning the laser to point through the at least two laser openings to align the laser along a first axis, positioning a reflective surface on the middle portion, the mirror reflecting at least a portion of a laser beam toward the rear opening, adjusting the laser to pass through the rear opening after being reflected by the reflective surface, and adjusting the focal point of the laser to the position of optical fibers positioned on the front portion.

In some embodiments, the adjusting steps are performed by software associated with the laser.

In other embodiments, the calibration assembly also includes at least one detector to detect at least one of the intensity and location of the laser beams.

Additional features and advantages of the invention will be set forth in the detailed description which follows and, in part, will be readily apparent to those skilled in the art from that description or recognized by practicing the invention as described herein, including the detailed description, the claims, and the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
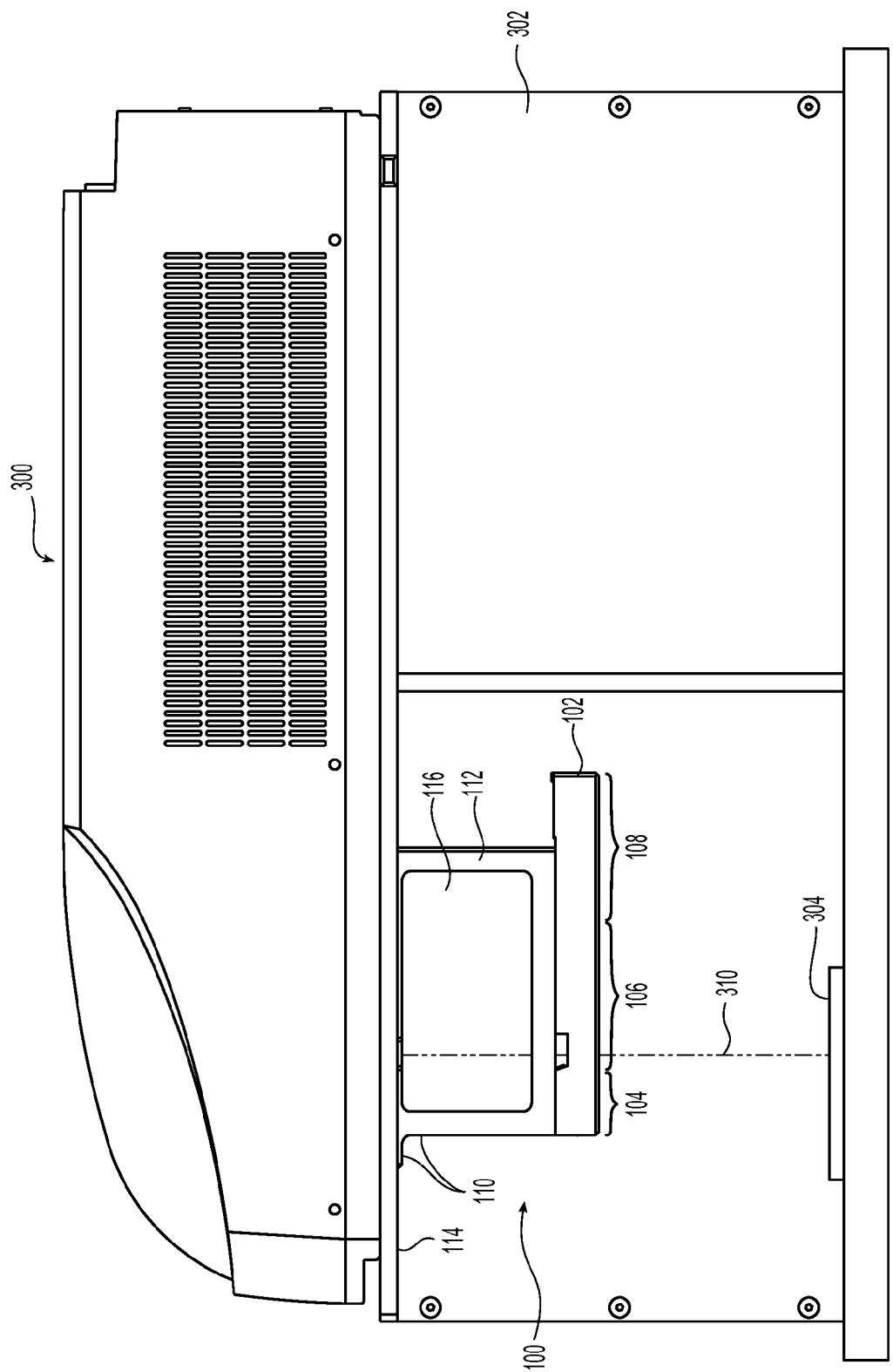
FIG. 1 is a side view of one embodiment of a calibration assembly according to the present invention, the calibration assembly attached to a laser.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
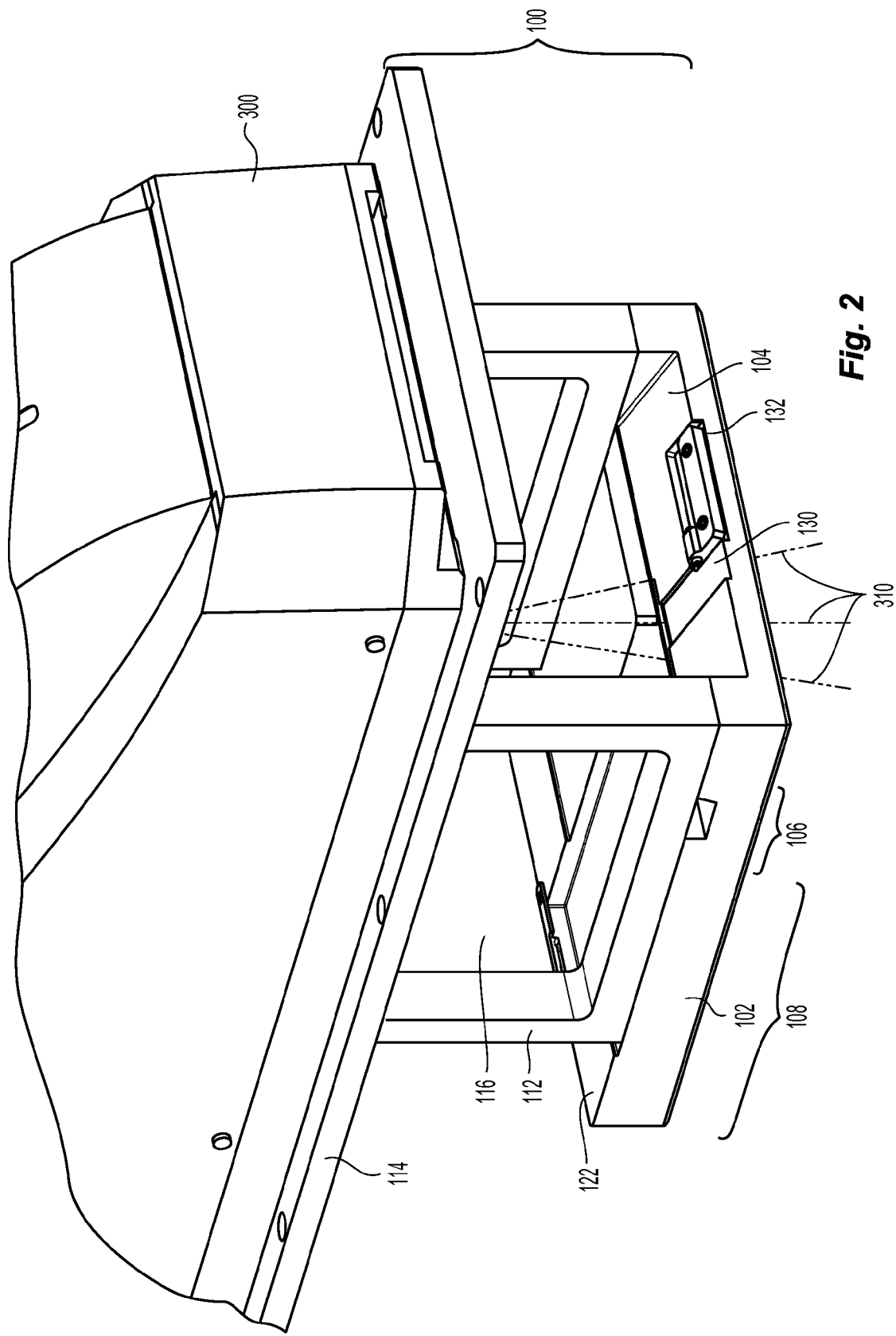
FIG. 2 is a partial perspective view from the left side of the calibration assembly of FIG. 1 with the clear polymer enclosure removed.
Figure 3:
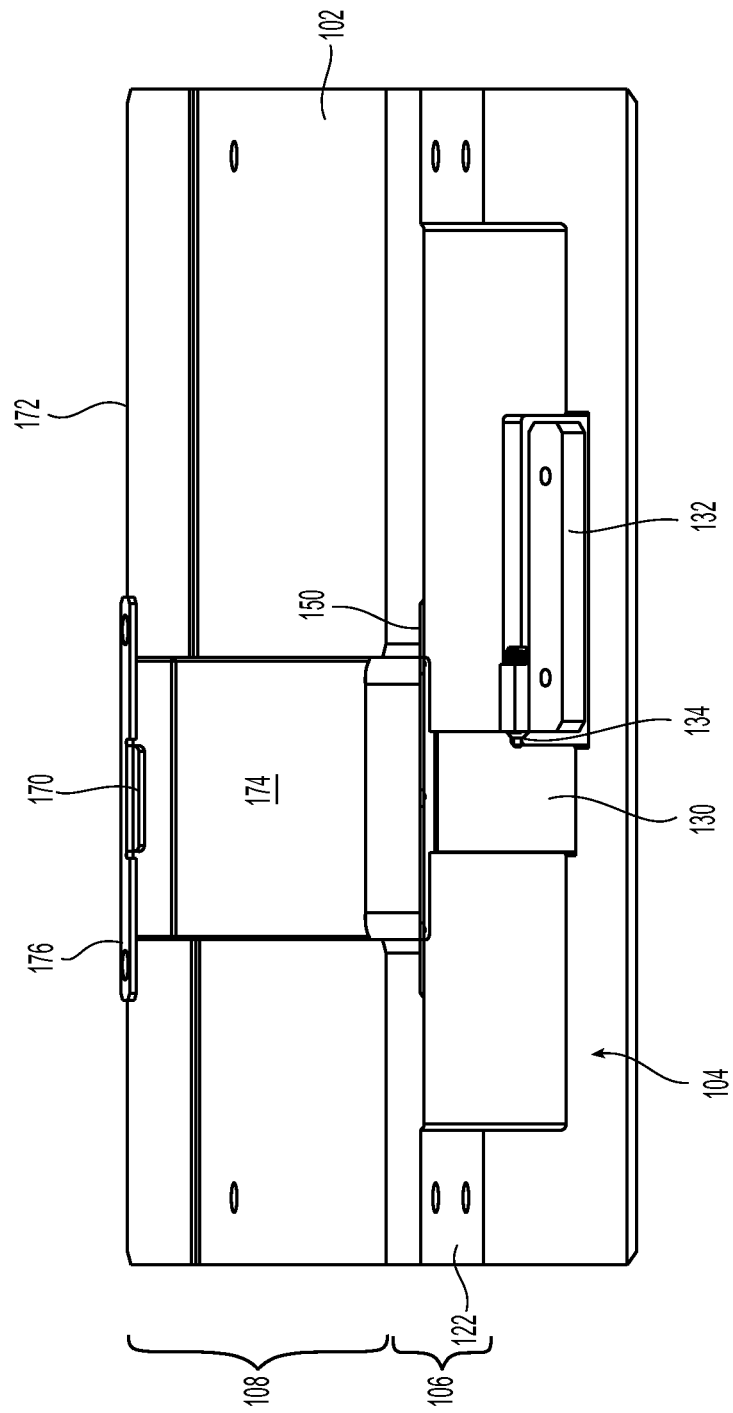
FIG. 3 is a front perspective view of a portion of the calibration assembly of FIG. 1.

Referring to FIGS. 1 and 2, a calibration assembly 100 is illustrated as being attached to a laser 300 and having a clear polymer case 302 surrounding the calibration assembly 100 to support the laser 300 and block the users from the laser beam and any stray optical fiber pieces that are removed from the optical fibers as described below in more detail. The case 302 may be made of any material, be of any appropriate size and/or configuration as needed or wanted by the user.

The calibration assembly 100 has a base 102 that has a front portion 104, a middle portion 106 and a rear portion 108. The base 102 is attached to the laser by mounting elements 110. The mounting elements include the vertical elements 112 but may also include the horizontal rim portion 114 that is attached to and matches the outer dimensions of the laser 300. The vertical elements 112 of the mounting elements 110 are not integral with the base 102, but could be. Also, the vertical elements 112 are illustrated as having openings 116 to allow the user to be able to see from all sides, but at least a portion thereof may be solid as still fall within the scope of the invention.

At the bottom of the clear polymer case 302 is a catch tray 304 that is disposed to catch the pieces of the optical fibers (or anything else) that is trimmed by the laser 300. The catch tray 304 may be any appropriate material (e.g., metal, plastic, etc.) and of any appropriate shape (e.g., cupped, flat, concave, etc.).

The front portion 104 of the base 102 is configured to receive the optical fibers and other apparatus as illustrated in more detail below. The middle portion 106 is where the laser beam from the laser 300 interacts with the calibration assembly 100 and also has an opening 120 to allow the optical fiber pieces to fall through to the catch tray 304. The rear portion 108 extends rearward to provide a sufficient distance for a rear opening to be used to adjust the roll and pitch of the laser as described more in detail below.

The front portion 104 is preferable angled relative to the main surface 122 of the base 102. The front portion 104 is angled at a 18.6 degree angle cc, which allows for the laser to cut the optical fibers and results in a tip on the optical fibers that needs no further processing. While applicants submit that this angle cc is most preferable for the present invention, other angles could be used and still fall within the scope of the present invention.

The front portion 104 also has a channel 130 into which the mirror and the optical fiber holder are disposed for calibrating and use of the calibration assembly 100. Adjacent the channel 130 is a biasing member 132 that will bias whichever apparatus is disposed in the channel 130. The biasing member 132 biases the apparatus against the left wall of the channel 130 by a ball plunger 134 in the biasing member. Other biasing elements could be used in the biasing member 132 and/or instead of the biasing member 132 and still fall within the scope of the present invention.

Figure 5:
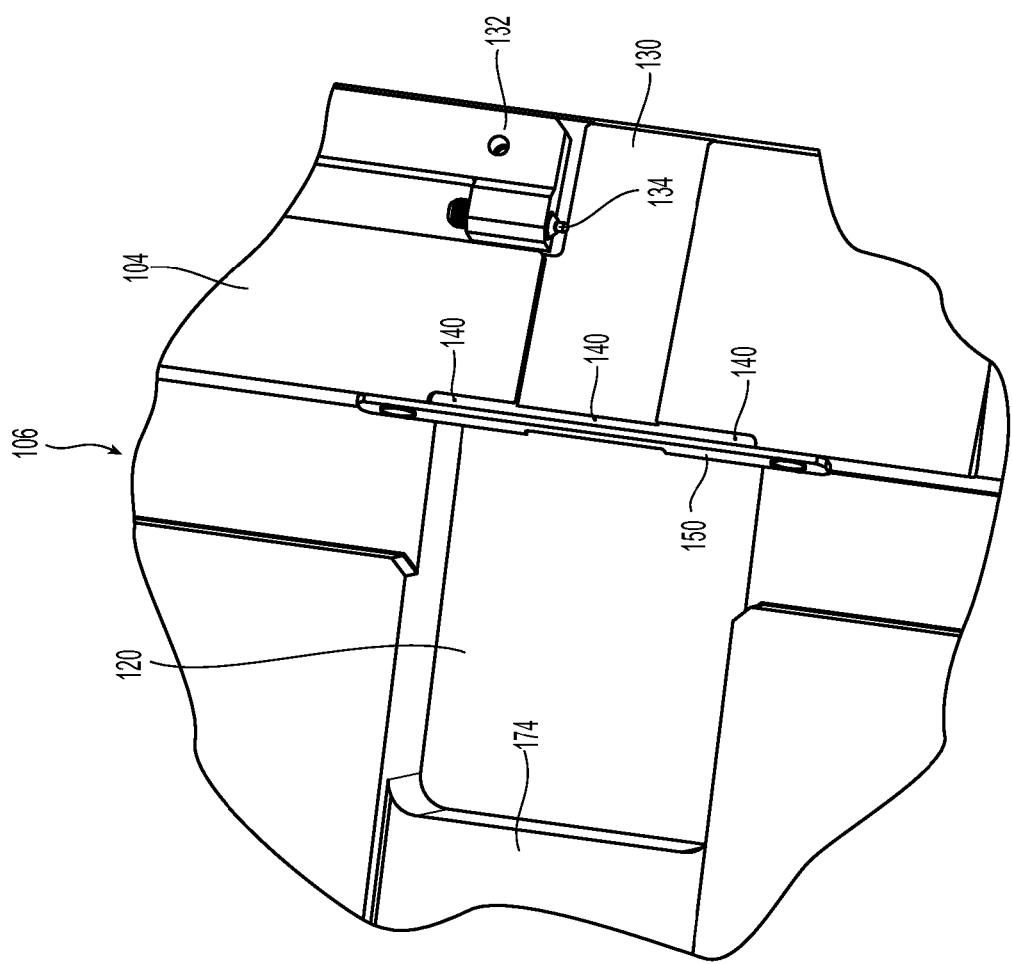
FIG. 5 is a partial top view of the front and middle portions of the calibration assembly of FIG. 1.

The center portion 106, best illustrated in FIG. 5, preferably has three laser openings 140 used to align the laser as described in more detail below. While three laser openings 140 are illustrated, the calibration assembly 100 may have more or fewer laser openings and still be within the scope of the present invention. The three laser openings 140 are in a line across the calibration assembly 100 at the end of the channel 130. The middle laser opening 140 is perpendicular to the main surface 122 of the base 102. When the laser 300 and the calibration assembly 100 are in alignment, meaning that the laser beam 310 is positioned at the origin of the calibration assembly 100, the laser beam will pass through the middle laser opening 140 and exit the middle laser opening 140 (see FIG. 2) and be visible on the catch tray 304. The side laser openings 140 are positioned at an angle relative to the center laser opening 140, depending on their distance to the side of the middle laser opening 140. The side laser openings 140 verify that the laser 300 and the calibration assembly 100 are positioned relative to one another in the x-y plane. Again, if the laser beams 310 do not pass through the side laser openings 140 (see FIG. 2), then the software of the laser can be adjusted to move the laser beam in the x-y plane. Most of the lasers allow the users to adjust the positioning of the laser by simply changing either the x or y values in the software, causing the laser to be appropriately moved. Once the laser 300 is aligned, the laser beams 310 will pass through the side laser openings 140. See FIG. 2. While three laser openings 140 is preferable, it is also possible to use only two of the laser openings 140 to align the laser in the x-y plane.

It should be noted that the laser beams 310 referenced above are the visible marking lasers of the laser 300 and not the cutting wavelength of the laser 300. The visible laser makes it easy to verify the laser is aligned to the holes or slots in the calibration assembly 100. In addition, the use of the visible marking lasers of the laser 300 is a safety precaution, making it more difficult for the user to injure one's self. As is known in the art, the visible marking lasers of the laser 300 are one the same positioning of the cutting wavelength of the laser, and therefore, the use of the visible marking lasers also aligns the cutting wavelength beam. Similarly, the laser beams 310 all emanate from the same optical path, but are split due to a turning mirror or other steering device in the laser 300.

The middle portion 106 has, disposed between the opening 120 and the laser openings 140, a guide bar 150 that is used as a reference point for a mirror and the optical fiber holder, as discussed below.

In order to verify the roll and the pitch of the laser 300 and the calibration assembly 100, a mirror 160 is used to reflect the laser beams 310 from the laser 300 rearward over the rear portion 108 and away from the user. The reflective portion 162 of the mirror 160 is preferably a zinc selenide beam combiner and not a true mirror. Zinc selenide acts as a reflective medium at most visible wavelengths, while allowing marker wavelengths to pass through without causing damage. See FIG. 6. By inverting the beam combiner 162, it acts as a beam splitter, redirecting the visible marker wavelength along the base 102 while passing any inadvertently triggered marking power of the laser 300 without damage to the calibration system 100. Additionally, by not reflecting the invisible marking wavelength (cutting wavelengths), the marking system remains eye-safe for the operator.

Figure 8:
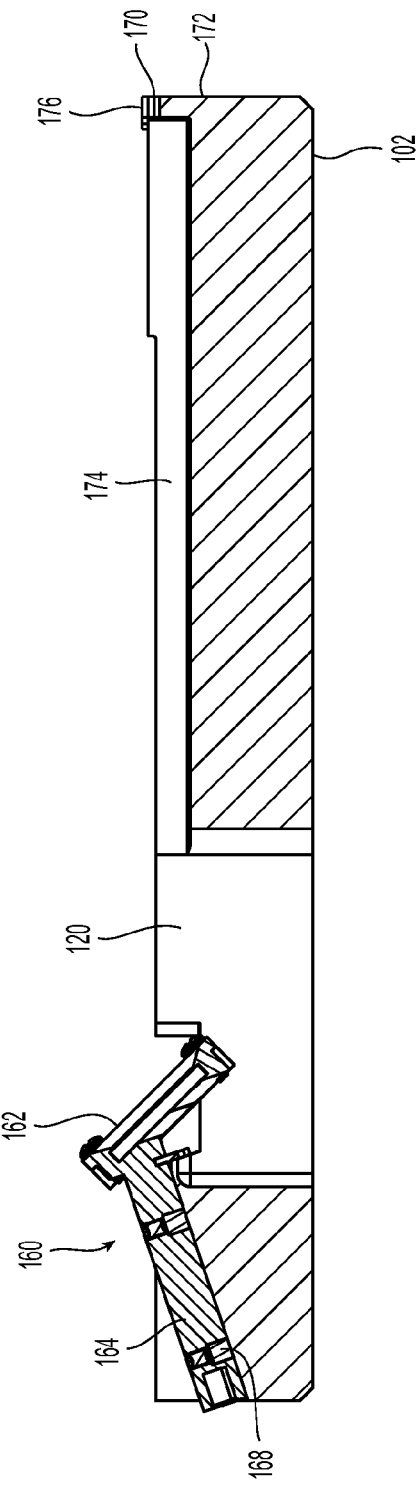
FIG. 8 is a cross sectional view of the mirror and calibration assembly of FIG. 7.
Figure 7:
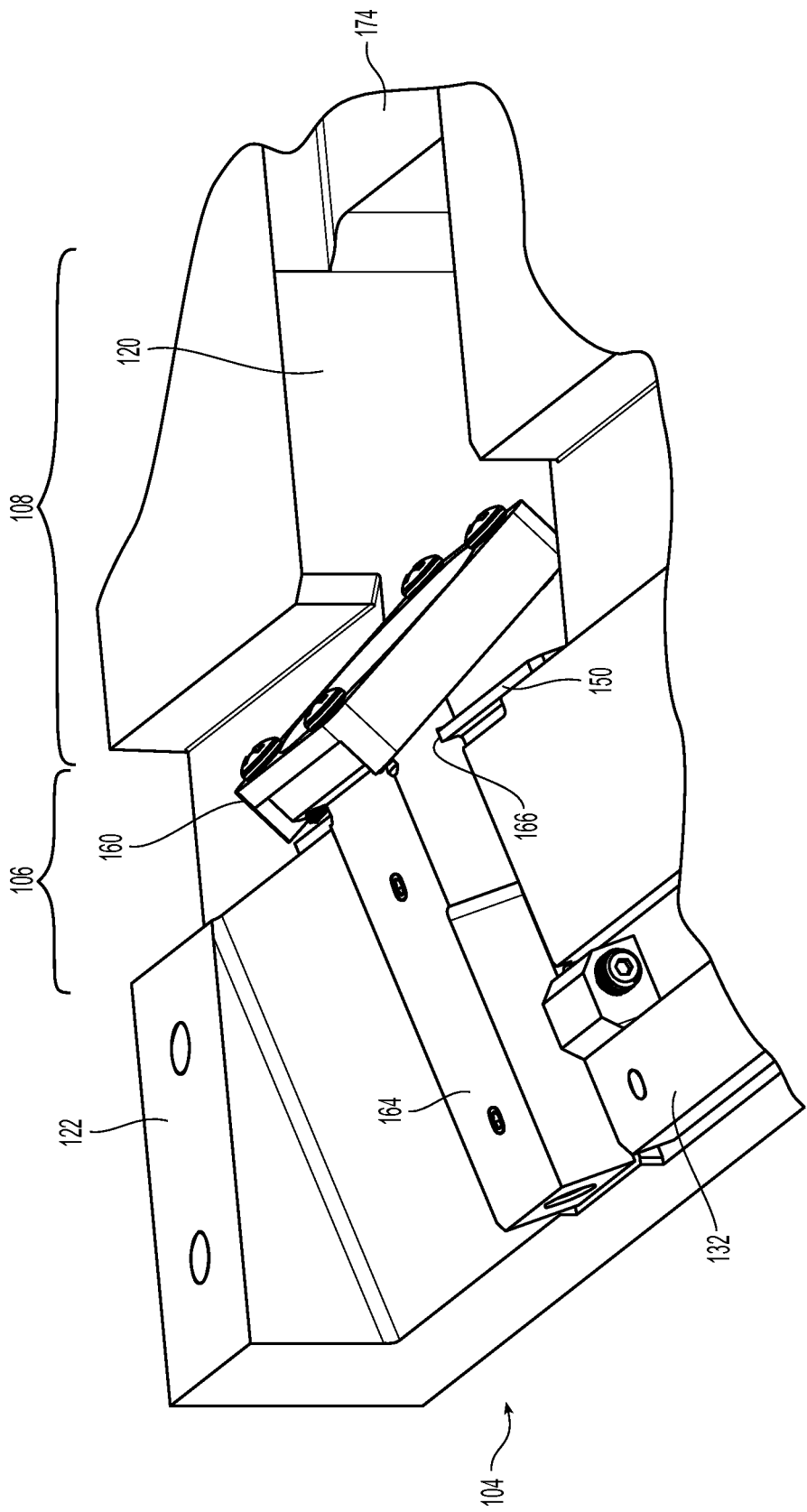
FIG. 7 is a partial enlarged view of the mirror of positioned in the front and middle portions of the calibration assembly.

The mirror 160 has the reflective (beam splitter) portion 162 and a handle 164. The handle 164 is configured to match the channel 130 and has a cut-out 166 in the handle 164 to engage the guide bar 150. See FIG. 7. By locating the mirror 160 in the channel 130 and the cut-out 166 on the guide bar, the mirror 160 is always positioned in the same place. The handle 164 preferably has magnets 168 that assist, with the help of biasing member 132, to keep the mirror 160 stationary during the alignment process. See FIG. 8.

Figure 6:
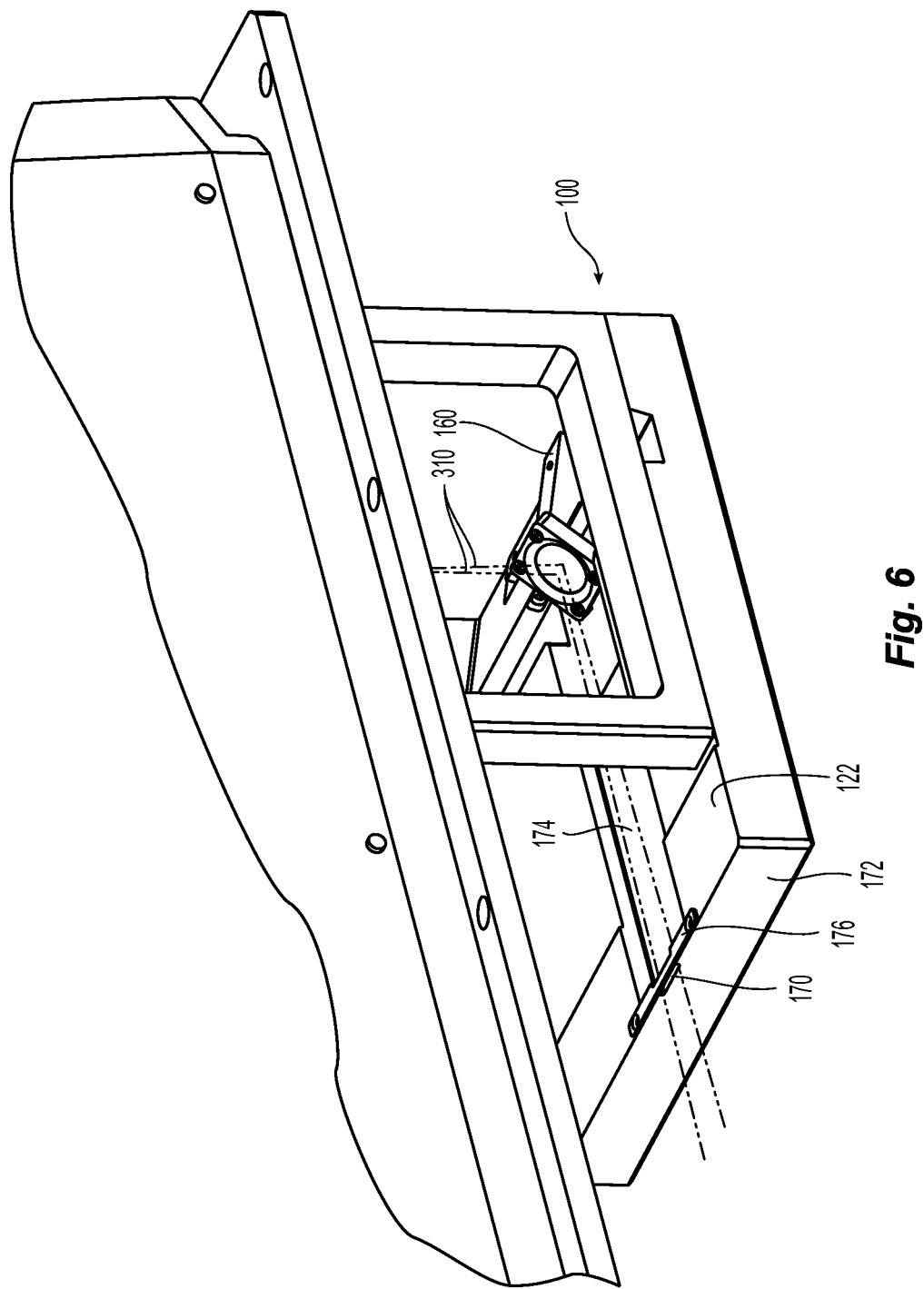
FIG. 6 is a partial prospective view of the calibration assembly with a mirror positioned to reflect a portion of the laser beams toward the rear portion.
Figure 9:
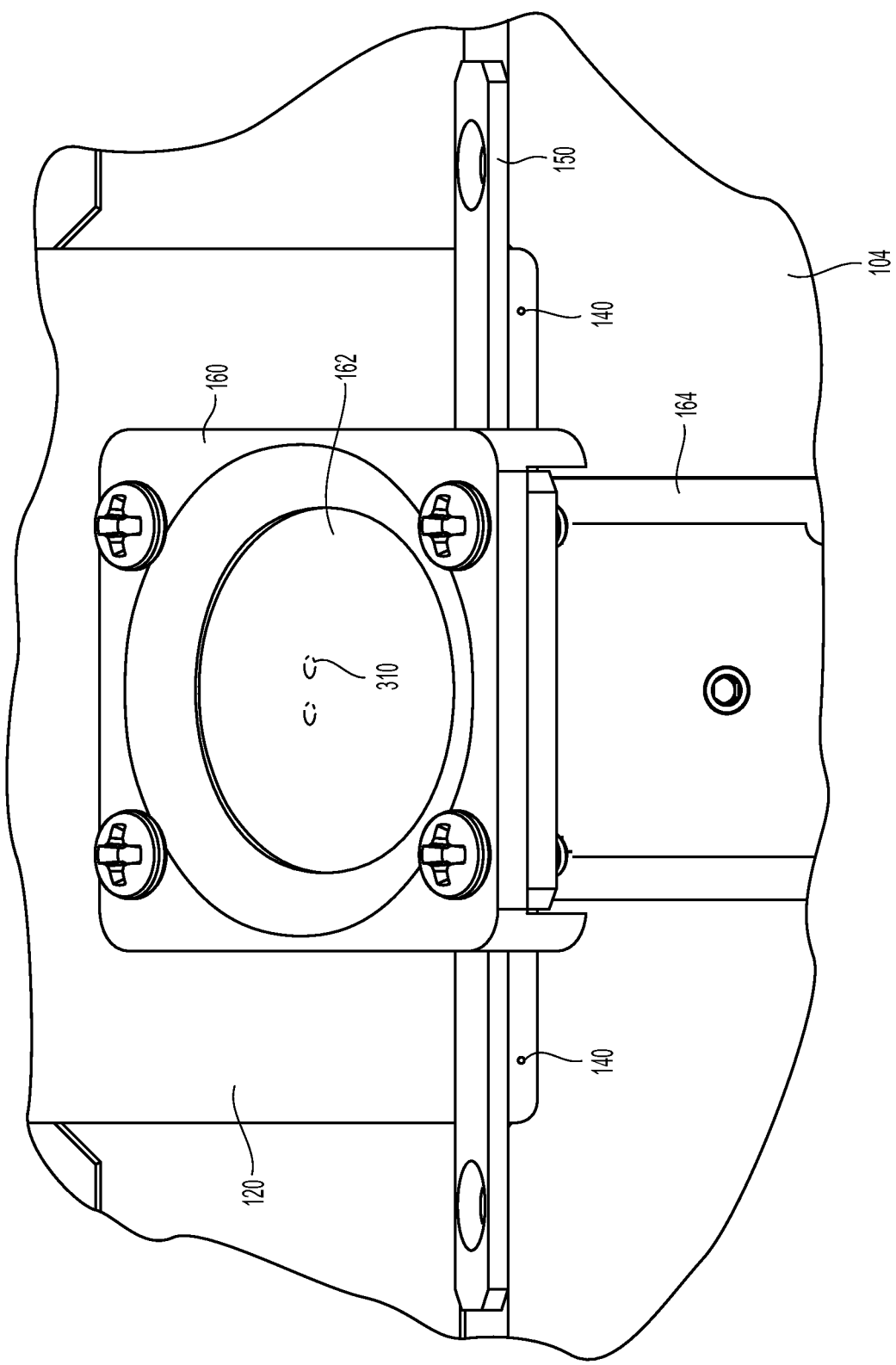
FIG. 9 is a top view of the mirror of FIG. 8 with the laser beams illustrated as hitting the mirror.
Figure 10:
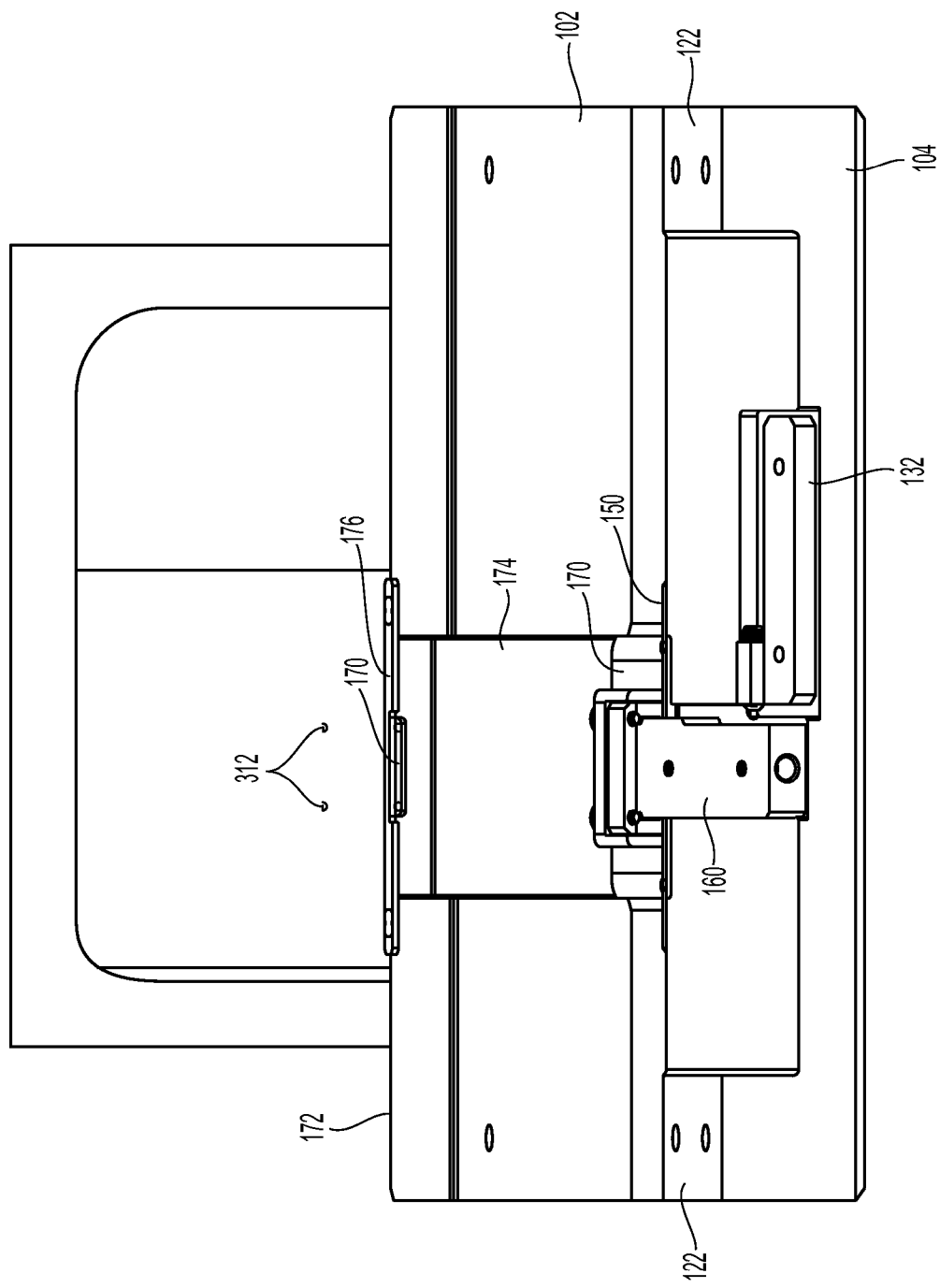
FIG. 10 is a front perspective view of the calibration assembly and mirror of FIG. 9 with the laser beams partially passing through the rear opening in the rear portion of the calibration assembly.
Figure 11:
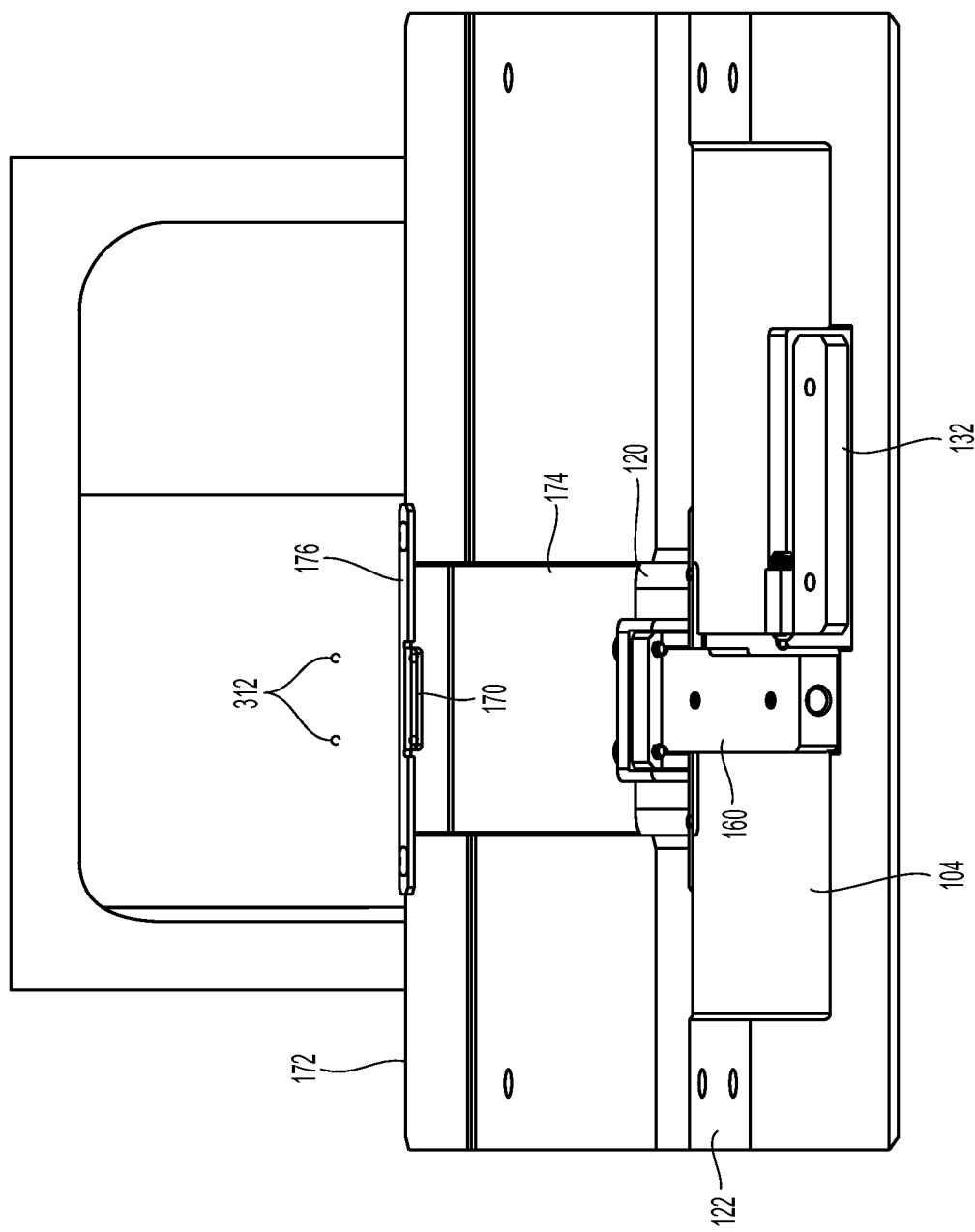
FIG. 11 is a front perspective view of the calibration assembly and mirror of FIG. 9 with the laser beams fully passing through the rear opening in the rear portion of the calibration assembly after adjustment

As illustrated in FIG. 9, the laser beams 310 are directed onto the reflective portion 162 of the mirror 160, which then travel toward the rear portion 108. The rear portion 108 has an opening 170 at the end 172 of the rear portion 108. The opening 170 may be closer to the middle portion 106, but the farther away the opening 170 is, the better alignment can be achieved. As seen in FIGS. 6 and 10, the rear portion 108 has a channel 174 that extends from the opening 120 to the end 172. The opening 170 is formed by the channel 174 and a bar 176 positioned across the channel 174. See FIG. 6. The base 102 could be constructed such that the channel 174 is not needed and the opening is formed by a separate structure on the base 102. The opening 170 is configured such that the reflected laser beams 310 travel down the channel 174 and through the opening 170. If the laser 300 and the calibration assembly 100 are not aligned for the roll and pitch, the laser beams 310 will not pass completely through the opening 170 and they will not be complete spots behind the opening 170. See FIG. 10, which illustrates the clipped beams 310 as spots 312. In FIG. 11, the spots 312 are illustrated as complete circles after adjustment was made to the laser and/or the calibration assembly 100. The adjustment can once again be made using the software associated with the laser 300 or shims could even be placed between the laser 300 and the mounting elements 110.

Figure 12:
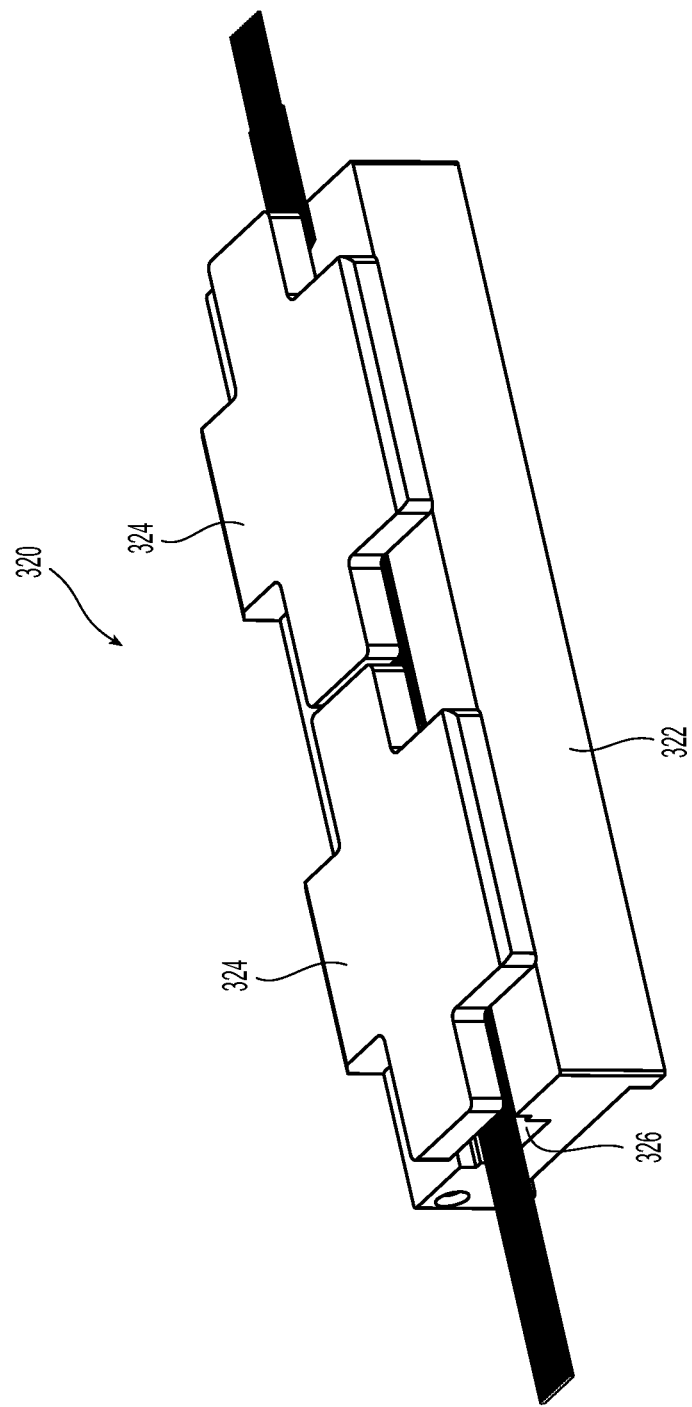
FIG. 12 is a perspective view of a fiber optic holder to be used with the calibration assembly.

One example of an optical fiber holder 320 that can be used with the present invention is illustrated in FIG. 12. The optical fiber holder 320 has a base 322 and two covers 324. A channel 326 in base 322 holds optical fibers therein with a compression element (not shown) on each of the two covers 324 to securely hold the optical fibers therein. The base 322 also fits in channel 130 in the front portion 104 of the base 102. The biasing member 132 also biases the optical fiber holder 320 as it did with the mirror 160. The optical fiber holder 320 is pushed against the guide bar 150. There is no cutout in the optical fiber holder 320 as there was in the mirror 160 to fit over the guide bar 150, but the combination of biasing member 132 and the front edge of the optical fiber holder 320 making contact with the guide bar 150 is sufficient for placement of the optical fiber holder 320.

Figure 4:
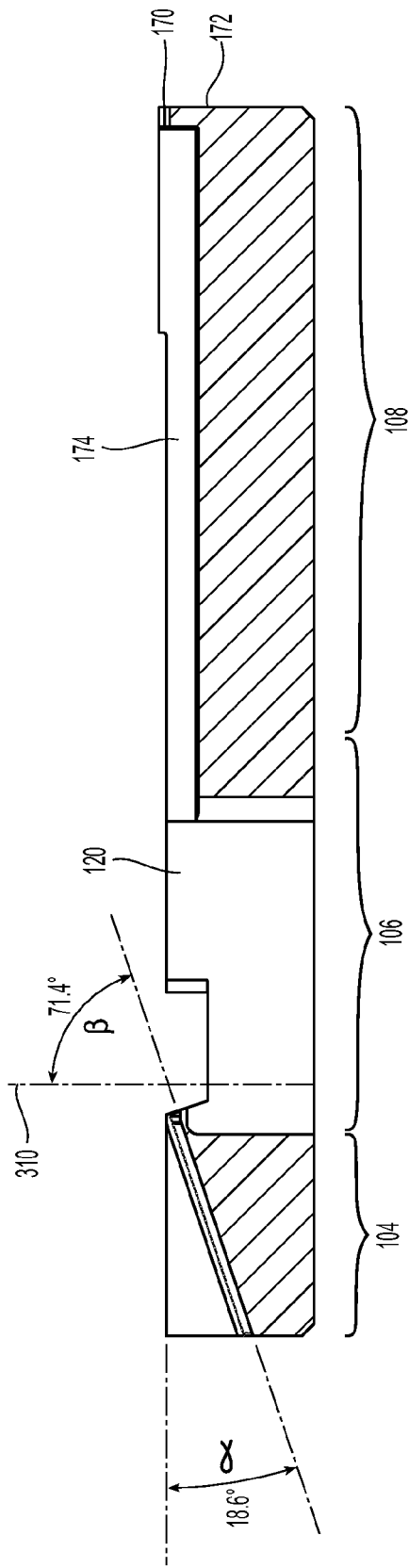
FIG. 4 is a cross section view of a portion of the calibration assembly of FIG. 1.
Figure 13:
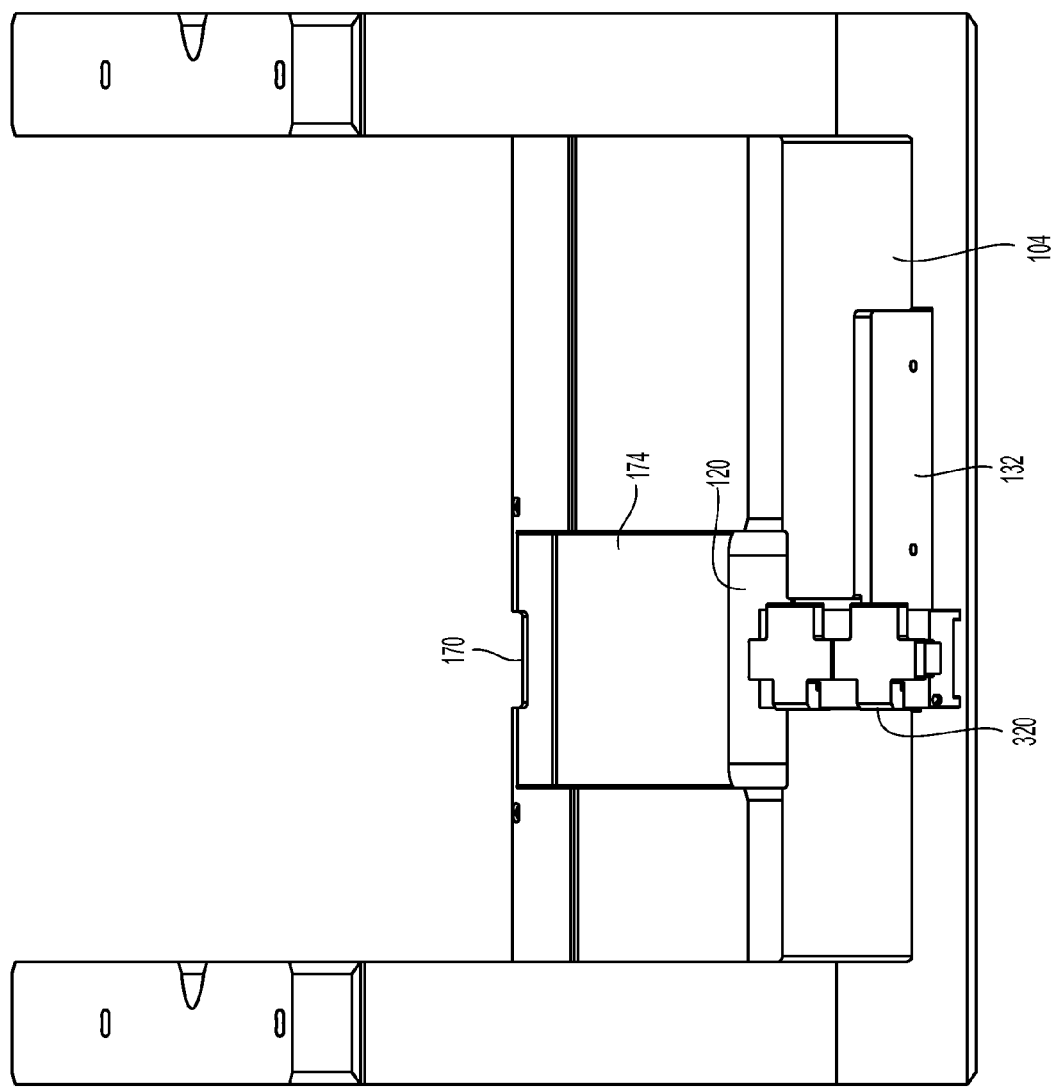
FIG. 13 is a front perspective view of the calibration assembly and fiber optic holder of FIG. 12.
Figure 14:
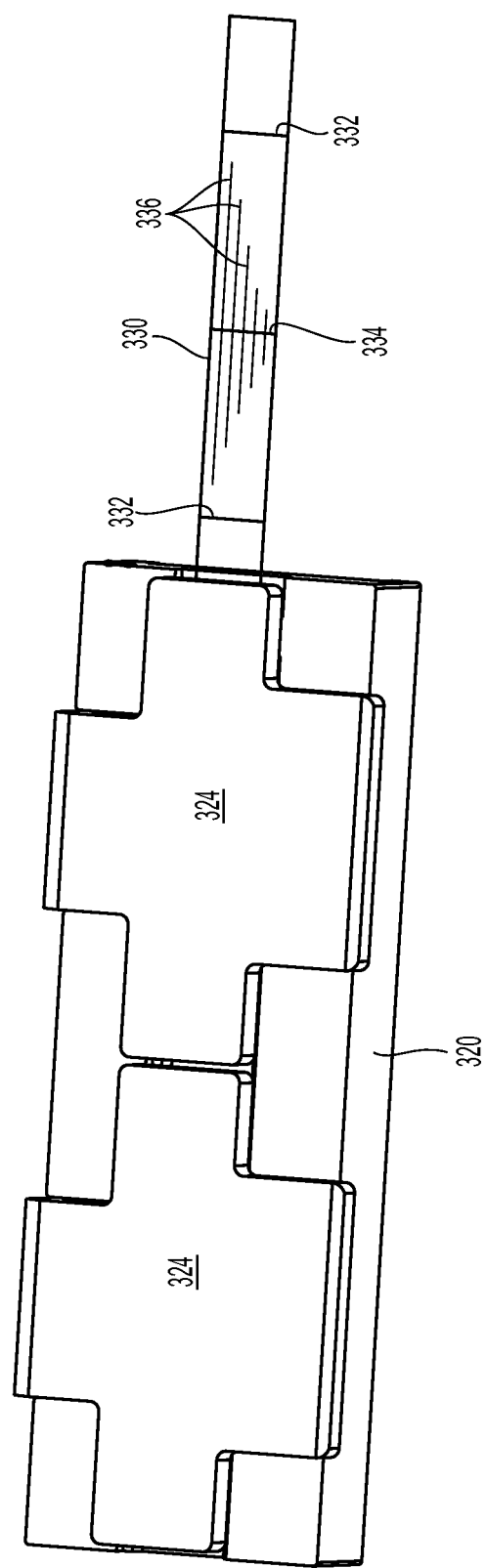
FIG. 14 is a top perspective view of the fiber optic holder of FIG. 12 with laser burn paper illustrating the method of finding the focal point of the laser.

The last step is to fix the focal point of the laser 300 at the appropriate location for proper removal of the optical fibers. This is the z-direction adjustment. In order to do this, a piece of laser burn paper 330 is inserted into the optical fiber holder 320, which is in turn inserted into the calibration assembly 100. See. FIG. 13. The laser 300, using the invisible marking wavelength (cutting wavelengths), the laser is triggered to mark the laser burn paper 330. Since the laser burn paper 330 is positioned at an angle (the angle β in FIG. 4 is 71.4 degrees) relative to the laser beams 310 (see FIG. 4), the laser marks the laser burn paper 330 as illustrated in FIG. 14. The laser is programmed to make three cross-paper marks, two outer marks 332 and one inner mark 334. The inner mark 334 is the location that the laser will cut the optical fibers. The two outer marks 332 are used to assist in finding the five power lines 336 that are along the axis of the optical fibers and down the length of the laser burn paper 330. The five power lines 336 are made using a power setting that is close to the power needed to mark the laser burn paper 330 and each of the five power lines 336 is made with a lower power than the line made before it. Since the laser burn paper 330 is at an angle to the laser beam and the power is sufficient to burn the paper only near the focal point, the exact focal point of the laser 300 can be determined from the lengths of the five power lines 336. The focal point of the laser will be the midpoint of the five power lines 336 on the laser burn paper 330. The laser 300 can then be adjusted to move the focal point from where it is to the inner mark 334, so that the focal point is where the optical fibers will be cut.

Figure 15:
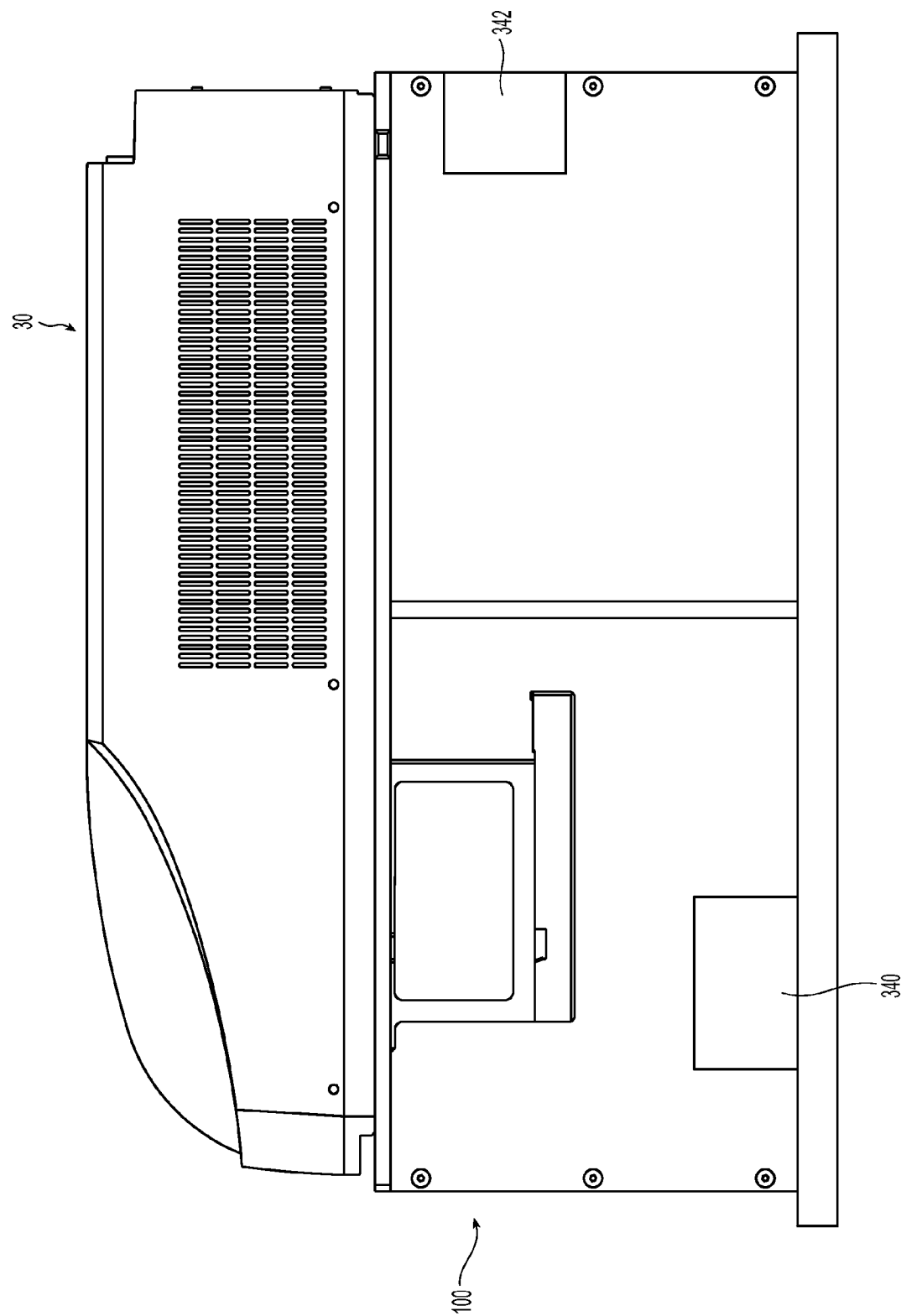
FIG. 15 is a side view of another embodiment of a calibration assembly according to the present invention, the calibration assembly attached to a laser.

In another embodiment, as illustrated in FIG. 15, a detector can be used to detect the location and/or the intensity of the laser beams 310 during the above described process. As seen in FIG. 15, a detector 340 can be placed directly under the calibration system 100 to identify the location of and intensity of the laser beams 310 as they pass through the three laser openings 140. The detector 340 can either directly or indirectly be used to adjust the laser 300. Similarly, a detector 342 can be placed at the end 172 of the rear portion 108 to adjust the roll and the pitch of the laser 300.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A calibration assembly for a laser used to cleave optical fibers comprising:
a base fixedly attached to the laser, the base further comprising
a front portion to receive optical fibers in a predetermined relationship to the base;
a middle portion having at least two laser openings, the at least two laser openings generally disposed in line with a laser beam emanating from the laser; and
a rear portion having a rear opening in alignment with the front portion; and
mounting elements to fixedly attach the base to the laser.

2. The calibration assembly according to claim 1, wherein front portion has a groove to receive optical fibers to be cleaved by the laser, the groove disposed at a predetermined angle relative to the laser beam emanating from the laser.

3. The calibration assembly according to claim 2, wherein the predetermined angle is 71.4 degrees relative to the laser beam.

4. The calibration assembly according to claim 1, wherein the at least two holes are spaced across a width of the middle portion.

5. The calibration assembly according to claim 1, further comprising a guide bar, the guide bar providing a reference location for positioning the optical fibers.

6. The calibration assembly according to claim 5, further comprising a mirror to reflect laser beams from the laser through the rear opening in the rear portion, the mirror configured to removably engage the guide bar.

7. The calibration assembly according to claim 1, wherein the at least two holes comprise three holes and the openings being non parallel to each other.

8. The calibration assembly according to claim 1, further comprising an optical fiber holder, the optical fiber holder configured to hold optical fibers and to engage the groove in the front portion of the base.

9. The calibration assembly according to claim 1, wherein the laser beam is a visible marking laser.

10. The calibration assembly according to claim 1, wherein the at least two laser openings comprises three laser openings.

11. A method of calibrating a laser to cleanly cleave optical fibers comprising the steps of:
attaching a calibration assembly to the laser, the calibration assembly comprising a base, the base further comprising a front portion to receive optical fibers in a predetermined relationship to the base, a middle portion having at least two laser openings, the at least two laser openings generally disposed in line with a laser beam emanating from the laser; and a rear portion having a rear opening in alignment with the front portion; and mounting elements to fixedly attach the base to the laser;
aligning the laser to point through the at least two laser openings to align the laser along a first axis;
positioning a reflective surface on the middle portion, the mirror reflecting at least a portion of a laser beam toward the rear opening;
adjusting the laser to pass through the rear opening after being reflected by the reflective surface; and
adjusting the focal point of the laser to the position of optical fibers positioned on the front portion.

12. The method of calibrating a laser to cleanly cleave optical fibers according to claim 11, wherein two different laser beams from the laser are reflected by the reflective surface.

13. The method of calibrating a laser to cleanly cleave optical fibers according to claim 11, wherein the adjusting steps are performed by software associated with the laser.

14. The method of calibrating a laser to cleanly cleave optical fibers according to claim 11, wherein software makes adjustments to a coordinate system within the laser to adjust the laser beams.

15. The method of calibrating a laser to cleanly cleave optical fibers according to claim 11, wherein the fibers positioned at angle other than 90 degrees relative to the laser beam.

16. The method of calibrating a laser to cleanly cleave optical fibers according to claim 11, wherein the adjustments are made using visible marking laser.

17. The method of calibrating a laser to cleanly cleave optical fibers according to claim 11, wherein the step of adjusting the focal point is performed with the cutting wavelength of the laser.

18. The method of calibrating a laser to cleanly cleave optical fibers according to claim 11, wherein laser burn paper is used in the step of adjusting of the focal point.

19. The method of calibrating a laser to cleanly cleave optical fibers according to claim 11, wherein the calibration assembly further comprises at least one detector to detect at least one of the intensity and location of the laser beams.

* * * * *